United States Patent
Chang et al.

(10) Patent No.: US 10,781,511 B2
(45) Date of Patent: Sep. 22, 2020

(54) METHOD FOR MANUFACTURING A GOLF CLUB HEAD

(71) Applicant: FUSHENG PRECISION CO., LTD, Taipei (TW)

(72) Inventors: Chun-Fu Chang, Taoyuan (TW); Gen-Wei Jhou, Taichung (TW)

(73) Assignee: Fusheng Precision Co., Ltd, Taipei (TW)

(*) Notice: Subject to any disclaimer, the term of this patent is extended or adjusted under 35 U.S.C. 154(b) by 353 days.

(21) Appl. No.: 15/949,146

(22) Filed: Apr. 10, 2018

(65) Prior Publication Data

US 2018/0340247 A1    Nov. 29, 2018

(30) Foreign Application Priority Data

May 23, 2017    (CN) .......................... 2017 1 0369521

(51) Int. Cl.

| | |
|---|---|
| *C22F 1/18* | (2006.01) |
| *A63B 53/04* | (2015.01) |
| *B21B 1/22* | (2006.01) |
| *C22C 14/00* | (2006.01) |
| *B23K 31/02* | (2006.01) |

(Continued)

(52) U.S. Cl.
CPC ............. *C22F 1/183* (2013.01); *A63B 53/04* (2013.01); *B21B 1/22* (2013.01); *B23K 31/02* (2013.01); *C22C 14/00* (2013.01); *A63B 2102/32* (2015.10); *B21B 2001/225* (2013.01); *B23K 2103/14* (2018.08)

(58) Field of Classification Search
CPC . C22F 1/183; A63B 53/04; B21B 1/22; B21B 2001/225; B23K 31/02; B23K 2103/14; C22C 14/00
See application file for complete search history.

(56) References Cited

U.S. PATENT DOCUMENTS

| | | |
|---|---|---|
| 2004/0082405 A1 | 4/2004 | Sano |
| 2004/0261912 A1 | 12/2004 | Wu |
| 2014/0283364 A1 | 9/2014 | Chiang et al. |

FOREIGN PATENT DOCUMENTS

| | | | |
|---|---|---|---|
| CN | 105986209 A | * | 10/2016 |
| CN | 105986209 A | | 10/2016 |
| JP | 2005-220388 A | | 8/2005 |

(Continued)

OTHER PUBLICATIONS

CN105986209A_English translation (Year: 2020).*

*Primary Examiner* — Christopher S Kessler
*Assistant Examiner* — Jiangtian Xu
(74) *Attorney, Agent, or Firm* — Alan D. Kamrath; Mayer & Williams PC

(57) ABSTRACT

A method for manufacturing a golf club head includes aging heat treat a sheet material made of a titanium alloy at 650-750° C. for 10-12 hours to obtain an aging heat treated sheet material. The aging heat treated sheet material is hot rolled to form a striking plate. The striking plate is annealed at 700-800° C. for 30-60 minutes to obtain an annealed striking plate. The annealed striking plate is welded to a club head body made of the titanium alloy to form a semi product. The semi product of the golf head is annealed at 500-700° C. for 30-240 minutes to obtain the golf club head. Thus, the golf club head with a Young's modulus higher than 119 GPa can be manufactured.

9 Claims, 1 Drawing Sheet

(51) Int. Cl.
   *A63B 102/32*   (2015.01)
   *B23K 103/14*   (2006.01)

(56) References Cited

FOREIGN PATENT DOCUMENTS

JP     2010-100943 A    5/2010
   JP     2016-146915 A    8/2016

* cited by examiner

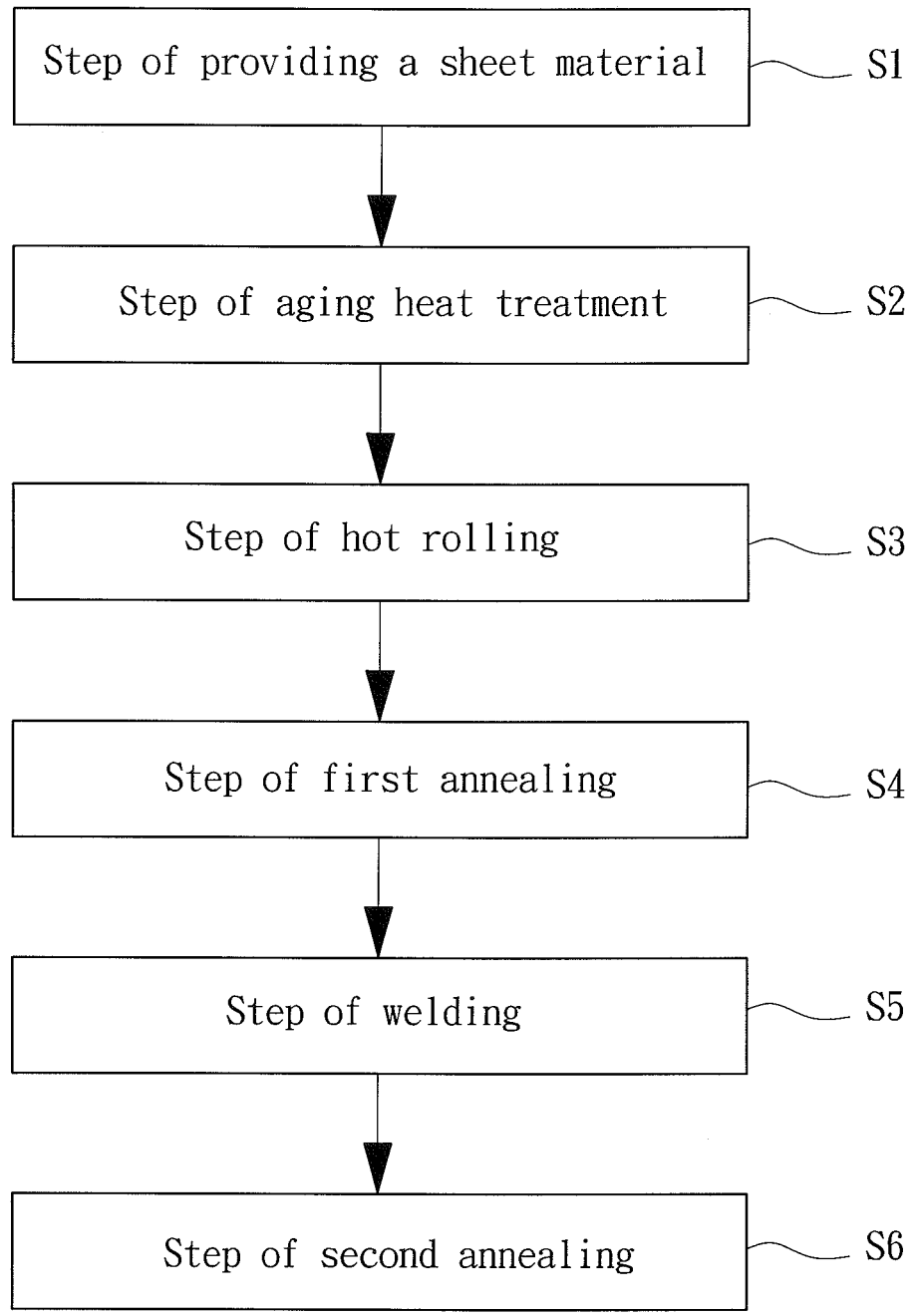

METHOD FOR MANUFACTURING A GOLF CLUB HEAD

CROSS REFERENCE TO RELATED APPLICATIONS

The application claims the benefit of China application serial No. 201710369521.8, filed May 23, 2017, the entire contents of which are incorporated herein by reference.

BACKGROUND OF THE INVENTION

1. Field of the Invention

The present invention generally relates to a method for manufacturing a golf club head and, more particularly, to a method for manufacturing the golf club with a Young's modulus higher than 119 GPa.

2. Description of the Related Art

A conventional method for manufacturing a golf club head includes smelting a titanium alloy T9S to form a titanium alloy rod. The titanium alloy rod is forged into a flat blank. The blank is then hot rolled to form a thin blank. The thin blank is cold rolled, and annealed to form a striking plate. A semi product is obtained by combining the striking plate and a club head body, followed by being heat treated at 500-700° C. to obtain a golf club head.

Although the golf club head manufactured by the conventional method has a tensile strength about 151 ksi, as well as a yield strength about 136 ksi, a Young's modulus of the golf club head is only 119 Gpa. Therefore, the manufactured golf club head has a poor performance on running distance. In light of this, the conventional method should be improved.

SUMMARY OF THE INVENTION

It is therefore an objective of the present invention to provide a method for manufacturing a golf club head to manufacture a golf club head having a Young's modulus higher than 119 GPa.

One embodiment of the invention discloses a method for manufacturing a golf club head including a step of providing a sheet material, a step of aging heat treatment, a step of hot rolling, a step of first annealing, a step of welding and a step of second annealing. In the step of providing the sheet material, a sheet material made of a titanium alloy is provided. The titanium alloy includes 7-9.5 wt % of aluminum, 0.5-2 wt % of vanadium, 0.05-0.4 wt % of silicon, less than 0.4 wt % of iron, less than 0.15 wt % of oxygen, less than 0.1 wt % of carbon, less than 0.05 wt % of nitrogen, the rest are titanium and impurities. A density of the titanium alloy is 4.32-4.35 g/cm$^3$. In the step of aging heat treatment, the sheet material is aging heat treated at 650-750° C. for 10-12 hours to obtain an aging heat treated sheet material. In the step of hot rolling, the aging heat treated sheet material is hot rolled to form a striking plate. In the step of first annealing, the striking plate is annealed at 700-800° C. for 30-60 minutes to obtain an annealed striking plate. In the step of welding, the annealed striking plate is welded to a club head body to form a semi product. The club head body is also made of the titanium alloy described above. In the step of second annealing, the semi product is annealed at 500-700° C. for 30-240 minutes to obtain a golf club head. Compared to the golf club head manufactured by the conventional method, the golf club head manufactured by the method according to the present invention has a higher Young's modulus. Thus, when a user impact a golf ball using the golf club head, the golf ball can have an increased ball speed and a decreased spin, increasing the running distance of the golf ball.

In an example, in the step of aging heat treatment, the sheet material is aging heat treated at 680-720° C. for 10.5-11.5 hours. In the step of first annealing, the striking plate is annealed at 740-760° C. for 40-50 minutes. In the step of second annealing, the semi product is annealed at 580-620° C. for 50-70 minutes. Thus, the Young's modulus of the golf club head can be dramatically increased, increasing the running distance of the golf ball due to the impact of the golf club head.

In an example, the striking plate formed in the step of hot rolling has a thickness between 3.4 mm and 3.6 mm. The striking plate formed in the step of hot rolling has a face, and a difference between a transverse radius of curvature of the face and a longitudinal radius of curvature of the face is smaller than 30 mm.

In an example, the golf club obtained in the step of second annealing has a face. A coefficient of restitution of the face ranges from 0.82 to 0.83, and a characteristic time of the face is smaller than 257 As.

In an example, the aging heat treated sheet material obtained in the step of aging heat treatment has a size of crystal grains less than 18 μm.

BRIEF DESCRIPTION OF THE DRAWINGS

Sole FIGURE depicts a flow chart describing a method for manufacturing a golf club head according to an embodiment of the present invention.

DETAILED DESCRIPTION OF THE INVENTION

Referring to Sole FIGURE, a method for manufacturing a golf club head according to an embodiment of the present invention can approximately include: a step of providing a sheet material "S1", a step of aging heat treatment "S2", a step of hot rolling "S3", a step of first annealing "S4", a step of welding "S5" and a step of second annealing "S6". A golf club head having a Young's modulus higher than 119 GPa can be therefore manufactured.

Specifically, in the step of providing the sheet material "S1", a sheet material is provided. The sheet material can be made of a titanium alloy. The titanium alloy can be the titanium alloy T9S. That is, the titanium alloy can include 7-9.5 wt % of aluminum (Al), 0.5-2 wt % of vanadium (V), 0.05-0.4 wt % of silicon (Si), less than 0.4 wt % of iron (Fe), less than 0.15 wt % of oxygen (O), less than 0.1 wt % of carbon (C), less than 0.05 wt % of nitrogen (N). The rest can be titanium (Ti) and impurities. The titanium alloy can have a density of 4.32-4.35 g/cm$^3$.

In the step of aging heat treatment "S2", the sheet material is aging heat treated at 650-750° C. for 10-12 hours to obtain an aging heat treated sheet material. At the same time, the sheet material is pressed by a steel plate with a weight of the steel plate being 3-5 tons, ensuring crystal grains in the obtained aging heat treated sheet material becoming denser (a size of the crystal grains reduces from 29 m to less than 18 μm), and a height difference of the obtained aging heat treated sheet material being smaller than 1 mm. Therefore, the Young's modulus of the golf club head can be improved. Preferably, in the step of aging heat treatment "S2", the sheet material is aging heat treated at 680-720° C. for 10.5-11.5 hours. It is worthy to noted that in the step of aging heat treatment "S2", the titanium alloy should be aging heat treated at a temperature below one-half of melting point thereof (½ Tm). With such performance, lots of metallographic structures can recrystallize in the sheet material without growth of the crystal grains.

After the step of aging heat treatment "S2", the step of hot rolling "S3" can be carried out. That is, the aging heat treated sheet material is hot rolled to form a striking plate. A thickness of the striking plate can be between 3.4 mm and 3.6 mm. The striking plate has a face with a difference between a transverse radius of curvature of the face (roll of the face) and a longitudinal radius of curvature of the face (budge of the face) being smaller than 30 mm.

Moreover, in the step of first annealing "S4", the striking plate is annealed at 700-800° C. for 30-60 minutes to obtain an annealed striking plate. Compared to the striking plate formed in the step of aging heat treatment "S2", the annealed striking plate obtained in the step of first annealing "S4" has a higher tensile strength. Thus, the annealed striking plate does not deformed easily because of the impact of the golf ball, prolonging the service life of the annealed striking plate. Preferably, in the step of first annealing "S4", the striking plate can be annealed at 740-760° C. for 40-50 minutes.

In the step of welding "S5", the annealed striking plate obtained in the step of first annealing "S4" is welded to a club head body to form a semi product. It is worthy to note that the club head body is also made of the titanium alloy described above.

After the step of welding "S5", the step of second annealing "S6" is carried out, and the semi product is annealed at 500-700° C. for 30-240 minutes to obtain the golf club head. The golf club head has a face. A coefficient of restitution (COR) of the face is ranging from 0.82 to 0.83, and a characteristic time (CT) of the face is smaller than 257 μs. Metallographic structures transform from α+β phase (in the semi product) to near α phase (in the golf club head) during the step of second annealing "S6". Thus, although being impacted by the golf ball, the radian of the striking plate of the golf club head does not easily change, prolonging the service life of the striking plate of the golf club head. Moreover, stress produced in the step of welding "S5" can also be released, preventing the weld between the striking plate and the club head body of the golf club head from cracking. Thus, the yield of the golf club head can be improved. Preferably, in the step of second annealing "S6", the semi product is annealed at 580-620° C. for 50-70 minutes.

To evaluate the golf club head having the Young's modulus higher than 119 GPa can be manufactured by the method according to the present invention, the following trials are carried out.

Trial (A).

Referring to TABLE 1, in trial (A), the annealed striking plate of group A0 is obtained by hot rolling the sheet material made of the titanium alloy T9S, followed by annealing the striking plate at 750° C. for 45 minutes. That is, the step of aging heat treatment "S2" is not carried out.

Moreover, the annealed striking plate of group A1 is obtained by sequentially carrying out the step of aging heat treatment "S2" (700° C. for 11 hours), the step of hot rolling "S3" and the step of first annealing "S4".

TABLE 1

| Groups | Step of aging heat treatment "S2" | Young's modulus (Gpa) |
| --- | --- | --- |
| A0 | X | 117 |
| A1 | 700° C., 11 hours | 147 |

Referring to TABLE 1, the annealed striking plate of group A1 has the Young's modulus of 147 Gpa, which is apparently higher than that of the annealed striking plate of group A0.

Trial (B).

In trial (B), the golf club heads of groups B1 and B2 are obtained by sequentially carrying out the step of providing the sheet material "S1" (the sheet material made of the titanium alloy T9S), the step of aging heat treatment "S2" (700° C. for 11 hours), the step of hot rolling "S3", the step of first annealing "S4" (under the conditions listed in TABLE 2), the step of welding "S5", and the step of second annealing "S6" (600° C. for 60 minutes).

TABLE 2

| Group | Step of first annealing "S4" | Young's modulus (Gpa) |
| --- | --- | --- |
| B1 | 750° C. for 45 minutes | 147 |
| B2 | 780° C. for 45 minutes | 137 |

Referring to TABLE 2, the golf club heads of groups B1 and B2 have the Young's modulus ranging from 137 Gpa to 147 Gpa. Moreover, the golf club head of group B1 has the higher Young's modulus.

Trial (C).

A scatter plot displaying the association between the coefficient of restitution (COR) and the characteristic time (CT) is created. A regression equation of the golf club head manufactured by the method according to the present invention is calculated as COR=0.0004×CT+0.726. Compared to the regression equation "COR=0.000436×CT+0.718" published by the United States Golf Association (USGA), at the same characteristic time, the golf club head manufactured by the method according to the present invention has a higher coefficient of restitution, indicating the golf club head has the higher Young's modulus.

Trial (D).

The golf club head manufactured by the conventional method is used as group D0. The golf club head manufactured by the method according to the present invention is used as group D1. The golf ball is respectively impacted by the golf club heads of groups D0 and D1, and the ball speed as well as the spin of the golf ball is recorded. Referring to TABLE 3, the golf ball impacted by the golf club head of group D1 has a higher ball speed and a lower spin, increasing the running distance at least 3-5 yards.

TABLE 3

| Group | Ball speed (mph) | Spin (rpm) |
| --- | --- | --- |
| D0 | 146.5 | 3182.8 |
| D1 | 147.1 | 2874.4 |

Accordingly, compared to the golf club head manufactured by the conventional method, the golf club head manufactured by the method according to the present invention has a higher Young's modulus. Thus, when a user impact the golf ball using the golf club head, the golf ball can have an increased ball speed and a decreased spin, increasing a running distance of the golf ball due to the impact of the golf club head.

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. A method for manufacturing a golf club head, comprising:
   aging heat treating a sheet material at 650-750° C. for 10-12 hours to obtain an aging heat treated sheet material;
   hot rolling the aging heat treated sheet material to form a striking plate;
   annealing the striking plate at 700-800° C. for 30-60 minutes to obtain an annealed striking plate;
   welding the annealed striking plate to a club head body to form a semi product; and
   annealing the semi product at 500-700° C. for 30-240 minutes to obtain the golf club head;
   wherein both the sheet material and the club head body are made of a titanium alloy comprising 7-9.5 wt % of aluminum, 0.5-2% of vanadium, 0.05-0.4% of silicon, less than 0.4 wt % of iron, less than 0.15 wt % of oxygen, less than 0.1 wt % of carbon, less than 0.05 wt % of nitrogen, with the rest being titanium and impurities, and a density of the titanium alloy is 4.32-4.35 g/cm$^3$.

2. The method as claimed in claim 1, wherein the sheet material is aging heat treated at 680-720° C. for 10.5-11.5 hours to obtain the aging heat treated sheet material.

3. The method as claimed in claim 1, wherein the striking plate is annealed at 740-760° C. for 40-50 minutes to obtain the annealed striking plate.

4. The method as claimed in claim 1, wherein the semi product is annealed at 580-620° C. for 50-70 minutes to obtain the golf club head.

5. The method as claimed in claim 1, wherein the aging heat treated sheet material is hot rolled to form the striking plate having a thickness between 3.4 mm and 3.6 mm.

6. The method as claimed in claim 1, wherein the aging heat treated sheet material is hot rolled to form the striking plate having a face with a difference between a transverse radius of curvature of the face and a longitudinal radius of curvature of the face being smaller than 30 mm.

7. The method as claimed in claim 1, wherein the semi product is annealed to obtain the golf club head having a face with a coefficient of restitution of the face ranging from 0.82 to 0.83.

8. The method as claimed in claim 1, wherein the semi product is annealed to obtain the golf club head having a face with a characteristic time smaller than 257 μs.

9. The method as claimed in claim 1, wherein the sheet material is aging heat treated to obtain the aging heat treated sheet material having a size of crystal grains less than 18 μm.

* * * * *